(12) United States Patent
Schaefer et al.

(10) Patent No.: US 7,270,297 B2
(45) Date of Patent: Sep. 18, 2007

(54) HOIST FOR AIRCRAFT CABIN CONSTRUCTION

(75) Inventors: Karl J. Schaefer, Everett, WA (US); Thanh V. Duong, Renton, WA (US); Gary W. Coleman, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 10/768,935

(22) Filed: Jan. 30, 2004

(65) Prior Publication Data

US 2005/0184194 A1 Aug. 25, 2005

(51) Int. Cl.
*B64C 1/22* (2006.01)
(52) U.S. Cl. .................................. 244/137.1
(58) Field of Classification Search ............ 244/136.1, 244/137.1, 137.2, 118.1, 118.2, 118.5, 118.6, 244/125, 127, 129.1; 414/444–459
See application file for complete search history.

(56) References Cited

U.S. PATENT DOCUMENTS

| | | | |
|---|---|---|---|
| 121,688 A | | 12/1871 | Thompson et al. |
| 2,063,916 A | * | 12/1936 | Fitch ........................ 212/331 |
| 2,063,943 A | * | 12/1936 | Norbom ..................... 212/331 |
| 2,145,093 A | * | 1/1939 | Quayle ..................... 108/57.24 |
| 2,436,405 A | * | 2/1948 | Slate ........................ 89/1.59 |
| 2,453,869 A | * | 11/1948 | Slate ........................ 89/1.59 |
| 2,553,378 A | * | 5/1951 | Miller ....................... 212/318 |
| 2,604,281 A | * | 7/1952 | Werner et al. ............ 244/129.5 |
| 2,634,000 A | * | 4/1953 | Ulrich ....................... 414/433 |
| 2,636,188 A | * | 4/1953 | King ........................ 5/88.1 |
| 2,732,957 A | * | 1/1956 | Horner ..................... 414/788.9 |
| 2,828,166 A | * | 3/1958 | Herring ..................... 182/101 |
| 2,931,681 A | * | 4/1960 | Keller ....................... 254/2 R |
| 2,998,948 A | * | 9/1961 | Sisk ......................... 244/137.1 |
| 3,031,091 A | * | 4/1962 | Erickson et al. ............ 414/544 |
| 3,051,419 A | * | 8/1962 | Weiland et al. .......... 244/137.1 |
| 3,065,987 A | * | 11/1962 | Elsner et al. .............. 294/67.4 |
| 3,119,501 A | * | 1/1964 | Lemelson .................. 414/273 |
| 3,157,423 A | * | 11/1964 | Brie, Sr. ................... 294/67.1 |
| 3,174,634 A | * | 3/1965 | Peck ......................... 414/541 |
| 3,251,496 A | * | 5/1966 | Lamer et al. ............. 414/459 |
| 3,269,561 A | * | 8/1966 | De Ligt ..................... 212/333 |
| 3,356,039 A | * | 12/1967 | Borje et al. ............ 104/130.01 |
| 3,419,164 A | * | 12/1968 | O'Neill ...................... 414/345 |
| 3,463,334 A | * | 8/1969 | Longmire et al. ........ 244/137.1 |
| 3,478,904 A | * | 11/1969 | Courter .................... 244/137.1 |
| 3,506,138 A | * | 4/1970 | Travis ....................... 108/91 |

(Continued)

OTHER PUBLICATIONS www.answers.com, "Turnbuckle", pp. 1-3.*
www.wikipedia.org, "Hoist", pp. 1-2.*

*Primary Examiner*—Stephen A Holzen
(74) *Attorney, Agent, or Firm*—Lee & Hayes, PLLC

(57) ABSTRACT

A device is provided for hoisting a module for mounting into an overhead space, such as the crown of an aircraft fuselage. The device includes a frame that supports the module, and a lifting device that lifts the first frame to properly place the module. The lifting device includes a frame, attachment devices that attach the frame of the lifting device to overhead support frames, and a driving device that moves the frame of the lifting device up the attachment devices. The frame of the lifting device receives the frame that supports the module as the frame of the lifting device is moved by the driving device.

29 Claims, 8 Drawing Sheets

U.S. PATENT DOCUMENTS

| | | | | |
|---|---|---|---|---|
| 3,520,502 A * | 7/1970 | Smethers, Jr. | | 244/137.1 |
| 3,552,587 A * | 1/1971 | Warren | | 244/137.1 |
| 3,561,704 A * | 2/1971 | Schulze | | 244/137.1 |
| 3,596,969 A * | 8/1971 | La Rosa, Jr. | | 294/81.3 |
| 3,602,335 A * | 8/1971 | Gustetic | | 182/37 |
| 3,661,415 A * | 5/1972 | Piasecki | | 294/67.1 |
| 3,667,618 A * | 6/1972 | Bertola | | 212/319 |
| 3,712,567 A * | 1/1973 | Ruggeri | | 244/137.4 |
| 3,743,115 A * | 7/1973 | Saul et al. | | 414/286 |
| 3,776,492 A * | 12/1973 | Iben | | 244/137.1 |
| 3,811,579 A * | 5/1974 | Black | | 414/347 |
| 3,814,211 A * | 6/1974 | Pamer | | 182/14 |
| 3,841,442 A * | 10/1974 | Erickson et al. | | 187/226 |
| 3,930,548 A * | 1/1976 | Wallraff | | 180/6.5 |
| 3,952,974 A * | 4/1976 | Lang | | 244/137.1 |
| 4,290,367 A * | 9/1981 | Brause et al. | | 104/105 |
| 4,297,071 A * | 10/1981 | Dunbar | | 414/542 |
| 4,457,401 A * | 7/1984 | Taylor et al. | | 187/208 |
| 4,522,548 A * | 6/1985 | Oswald et al. | | 414/458 |
| 4,586,684 A * | 5/1986 | Carter et al. | | 244/137.1 |
| 4,653,707 A * | 3/1987 | Hamilton et al. | | 244/137.2 |
| 4,690,609 A * | 9/1987 | Brown | | 414/543 |
| 4,810,160 A * | 3/1989 | Emiliani et al. | | 414/543 |
| 4,858,855 A * | 8/1989 | Dalbera | | 244/137.1 |
| 4,860,975 A * | 8/1989 | Schliesing et al. | | 244/172.4 |
| 4,875,645 A * | 10/1989 | Courter | | 244/137.1 |
| 4,905,448 A * | 3/1990 | Plitt | | 53/399 |
| 5,014,935 A * | 5/1991 | Dalbera | | 244/137.1 |
| 5,018,929 A * | 5/1991 | Carson | | 414/408 |
| 5,076,515 A * | 12/1991 | Goon | | 244/137.1 |
| 5,083,727 A * | 1/1992 | Pompei et al. | | 244/118.6 |
| 5,192,176 A * | 3/1993 | Roberts | | 410/140 |
| 5,222,717 A * | 6/1993 | Traficant | | 254/122 |
| 5,241,722 A * | 9/1993 | Rohrlick et al. | | 14/71.5 |
| 5,253,827 A * | 10/1993 | Funk et al. | | 244/173.3 |
| 5,314,083 A * | 5/1994 | Wiggershaus et al. | | 212/319 |
| 5,363,770 A * | 11/1994 | Makimura et al. | | 104/172.5 |
| 5,383,652 A * | 1/1995 | Van Den Berg | | 269/17 |
| 5,489,033 A * | 2/1996 | Luebke | | 212/318 |
| 5,525,026 A * | 6/1996 | DeMonte et al. | | 414/542 |
| 5,772,360 A * | 6/1998 | Wood, II | | 405/3 |
| 5,775,641 A * | 7/1998 | Goon | | 244/118.1 |
| 5,868,217 A * | 2/1999 | Hines | | 182/37 |
| 5,915,290 A * | 6/1999 | Coleman et al. | | 89/1.59 |
| 5,927,648 A * | 7/1999 | Woodland | | 244/118.1 |
| 5,964,065 A * | 10/1999 | Migurski et al. | | 52/64 |
| 5,979,001 A * | 11/1999 | Marrero | | 15/53.1 |
| 6,003,813 A * | 12/1999 | Wentland et al. | | 244/118.5 |
| 6,019,565 A * | 2/2000 | Gesuale | | 414/458 |
| 6,126,890 A * | 10/2000 | Anderson | | 266/44 |
| 6,230,639 B1 * | 5/2001 | McLaughlin et al. | | 114/44 |
| 6,334,591 B2 * | 1/2002 | Charest et al. | | 244/137.2 |
| 6,379,104 B1 * | 4/2002 | Domino et al. | | 414/662 |
| 6,484,655 B1 | 11/2002 | Gibson | | |
| 6,494,404 B1 * | 12/2002 | Meyer | | 244/118.2 |
| 6,536,710 B1 * | 3/2003 | Bobzien et al. | | 244/119 |
| 6,640,986 B2 * | 11/2003 | Zakula et al. | | 212/273 |
| 6,695,533 B1 * | 2/2004 | Bulmann | | 405/3 |
| 6,814,188 B1 * | 11/2004 | Heckert | | 187/269 |
| 6,830,002 B1 * | 12/2004 | Walker | | 114/44 |
| 6,848,654 B1 * | 2/2005 | Mills et al. | | 244/118.5 |
| 6,857,620 B2 * | 2/2005 | Payne | | 254/324 |
| 6,880,672 B2 * | 4/2005 | Imberi | | 182/13 |
| 6,883,753 B1 * | 4/2005 | Scown | | 244/118.1 |
| 6,905,095 B1 * | 6/2005 | Gruzdeva et al. | | 244/137.1 |
| 6,918,345 B2 * | 7/2005 | Golden et al. | | 114/44 |
| 6,971,608 B2 * | 12/2005 | Harrington et al. | | 244/118.5 |
| 6,983,979 B2 * | 1/2006 | Rasmussen | | 296/156 |
| 6,983,980 B2 * | 1/2006 | Rasmussen | | 296/156 |
| 6,988,760 B2 * | 1/2006 | Rasmussen | | 296/156 |
| 6,991,067 B2 * | 1/2006 | Dube et al. | | 187/223 |
| 7,004,284 B2 * | 2/2006 | Chick | | 182/16 |
| 2002/0176767 A1 * | 11/2002 | Gisselberg | | 414/261 |
| 2003/0221916 A1 * | 12/2003 | Dube et al. | | 187/391 |
| 2005/0042068 A1 * | 2/2005 | Ehmen | | 414/661 |
| 2005/0184194 A1 * | 8/2005 | Schaefer et al. | | 244/118.1 |

* cited by examiner

HOIST FOR AIRCRAFT CABIN CONSTRUCTION

FIELD OF THE INVENTION

This invention relates generally to hoists and, more specifically, to portable hoists.

BACKGROUND OF THE INVENTION

Hoists are used throughout manufacturing industries to lift assemblies or modules into place for installation. In particular, hoists are frequently used in aircraft manufacturing operations.

For example, crew rest areas are included in commercial passenger and long haul cargo aircraft, such as the Boeing 777LR. Some of these crew rest areas are designed to be included in the crown of the fuselage, that is directly over the center seats. In order to accommodate the crew rest areas, wiring and ducting are moved outboard of the crown. Composite crew rest modules containing seats and bunks are suspended between specially engineered rails that also support stowbins located above seats in the cabin, as shown in FIG. 1. Up to six modules, providing bunks and seats for up to twelve crew members, can be installed fore and aft in the fuselage crown.

In a current fabrication/installation method, the crew rest modules are built as complete assemblies. The complete assemblies are then lifted into the crown of the airplane and secured in place. By installing complete modules with this method, flow time in the factory is conserved. Due to the large size and heavy weight of these modules, crew rest module installation requires a specific type of mechanical lift to correctly locate the modules in the crown of the fuselage. Space restrictions, portability, range of motion, and airplane floor loading concerns preclude the use of commercially available scissors lifts.

Shape, weight, and size of the crew rest modules preclude personnel from physically lifting the modules. The largest module is 84 inches wide, 56 inches tall, up to 113 inches long, and weighs over 600 lbs. Modules are typically loaded into the airplane sections prior to joining sections of the airplane. While moving the modules into the airplane, care must be taken not to load the airplane floor beyond 250 psi. A typical commercially available scissors lift capable of raising a module to the required waterline, about 97 inches off the floor, would weigh 1500 lbs. or more plus the weight of the module. A load weighing nearly one-ton would have to be maneuvered in the plane and the weight distributed across the floor.

In addition, there is no known scissors lift configuration capable of handling the weight and reaching the required height that will collapse sufficiently while carrying a crew rest module to fit in the headroom available within the airplane fuselage Therefore, there currently exists an unmet need to safely and efficiently raise crew rest modules or other modules into place at the crown of an aircraft fuselage.

SUMMARY OF THE INVENTION

The present invention provides a hoisting device that allows a module to be transported on a lightweight carriage capable of distributing the weight of the module across a floor, such as an airplane floor. The carriage is also capable of turning in its own footprint and moving in any direction. The carriage is capable of breaking down when empty and easily passes through a confined space, such as standard airplane passenger door, upon completion of use.

The hoisting device includes a frame that supports a module, and a lifting device that lifts the frame for properly placing the module. The lifting device includes a frame, attachment devices that attach the frame of the lifting device to overhead support frames, and a driving device that moves the frame of the lifting device up the attachment devices. The frame of the lifting device receives the frame that supports the module as the frame of the lifting device is moved by the driving device.

In accordance with further aspects of the invention, the driving device includes gear boxes, a transfer tube mounted between two of the gear boxes for activating one of the two gear boxes when the other of the two gear boxes is activated, and two tubes coupled to two of the gear boxes. The tubes coupled to the two gear boxes rotate when one of the two gear boxes is activated. The tubes coupled to two of the gear boxes may be telescoping tubes.

In accordance with still further aspects of the invention, the attachment devices include two drums mounted to each of the tubes coupled to two of the gear boxes, and straps attached at a first end to each drum and at a second end to one of the overhead support frames. The drums receive the respective strap when the tubes are rotated by the respective gear box.

In accordance with still another aspect of the invention, the gear boxes include first and second gear boxes, and a bevel gear that is mechanically coupled to one of the first or second gear boxes. The transfer tube is mounted to one of the first or second gear boxes and the bevel gear. The transfer tube activates one of the first or second gear boxes when the bevel gear is activated.

In accordance with still further aspects of the invention, the first frame includes a support frame that supports the module and dollies that temporarily support the support frame. The support frame includes at least two telescoping frame members.

In accordance with yet another aspect of the invention, the support frame further includes mounting pads that support the module and saddles that rotatably receive the second frame as the second frame is lifted.

In accordance with further aspects of the invention, the attachment devices further include two or more rails attachable to the one or more overhead support frames and cars having wheels. Each car is coupled to a corresponding strap and the cars are slideably received by one of the rails.

BRIEF DESCRIPTION OF THE DRAWINGS

The preferred and alternative embodiments of the present invention are described in detail below with reference to the following drawings.

DETAILED DESCRIPTION OF THE INVENTION

Embodiments of the present invention provide lifting devices for mounting modules into a confined space, such as the crown section of airplanes. The lifting device may also be used in other environments where lifting or lowering of a heavy load into a tight location is necessary.

Figure 1:
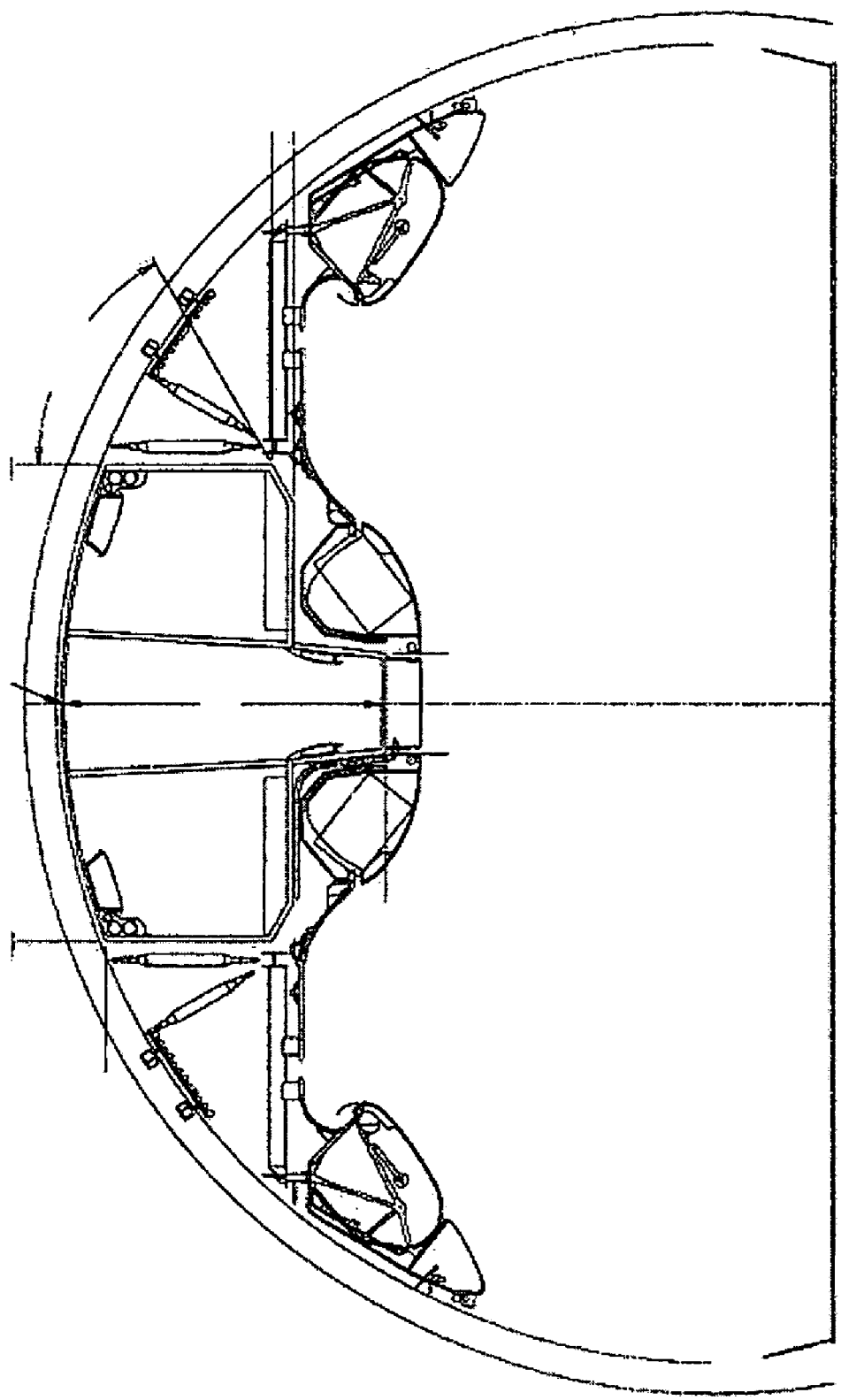
FIG. 1 is a cross-sectional view of a crew rest area module mounted in a crown section of an aircraft fuselage.
Figure 2:
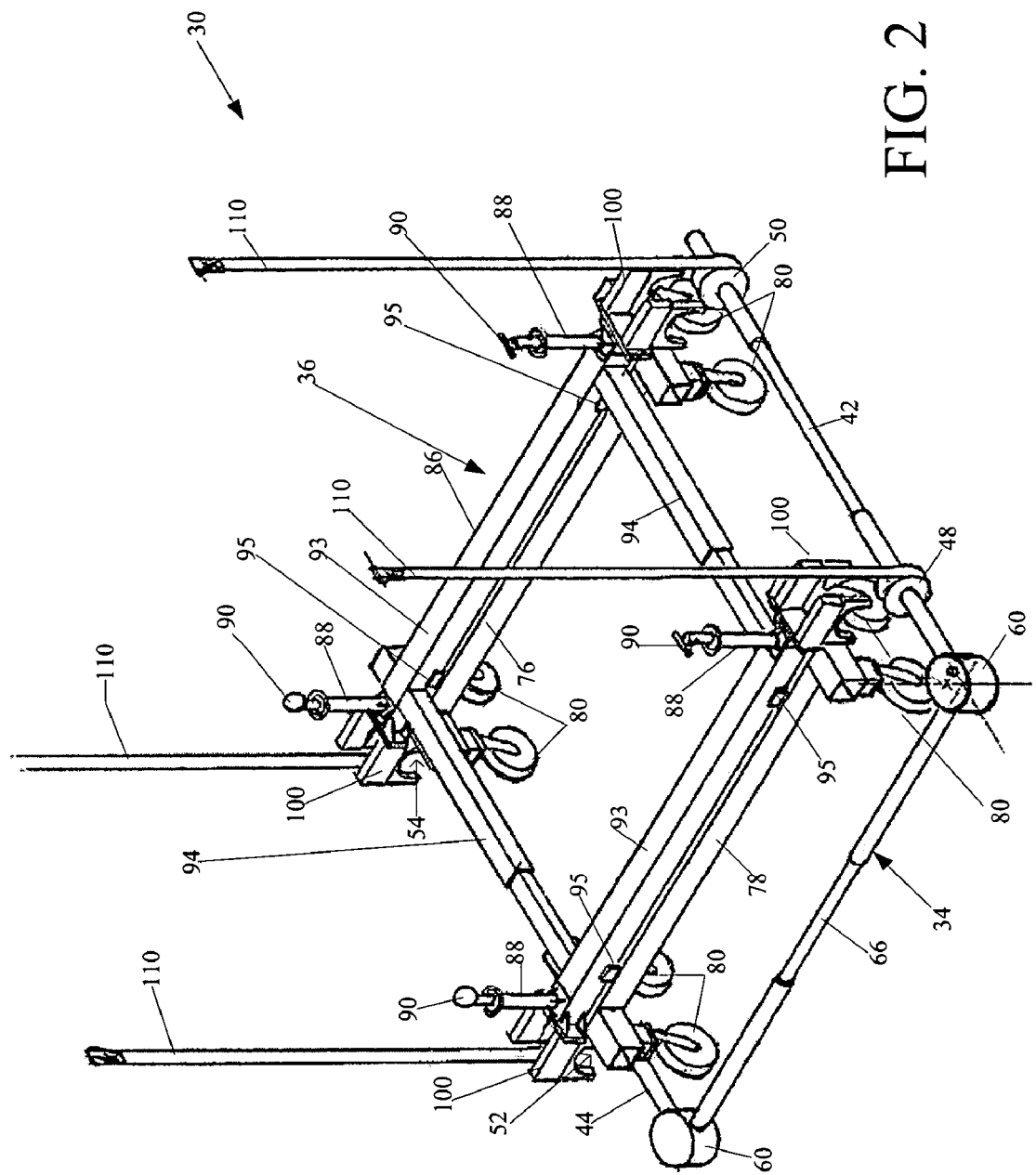
FIGS. 2 and 3 are perspective views of a module lifting device formed in accordance with one embodiment of the present invention.

FIG. 2 illustrates an exemplary lifting device 30 according to an embodiment of the present invention. The lifting device 30 includes a lifting unit 34 and a carriage unit 36. The lifting unit 34 includes two torque tubes 42 and 44 and strap drums 48-54 mounted to the torque tubes 42 and 44. The torque tubes 42 and 44 are linked by drive assemblies 60 and a transfer tube 66 mounted between the drive assemblies 60. The torque tubes 42 and 44 and the transfer tube 66 can be telescoping devices to allow the lifting unit 34 to be adjustable in width and length. The torque tubes 42 and 44 include internally mounted spring loaded stops to prevent the torque tubes 42 and 44 from accidentally pulling apart on extension.

The carriage unit 36 supports a module (not shown). The carriage unit 36 includes two dollies 76 and 78 and a support frame 86. Each of the dollies 76 and 78 include four wheels 80. The support frame 86 includes a rectangular frame having two opposing frame end members 93 and two opposing telescoping frame members 94 for accommodating various module lengths. Some embodiments may require that opposing frame end members 93 also be telescoping to accommodate varying widths as well. The dollies 76 and 78 receive the frame end members 93. The dollies 76 and 78 include flanges 95 that maintain the frame end members 93 in place on top of the dollies 76 and 78. Alternatively, locator pins or other means of position fixing may be used.

Support mounts 88 are attached near corners of the rectangular frame. The support mounts 88 include adjustable pads 90 for supporting the module (not shown). Four saddles 100 are mounted on the same side of the support frame 86 external to the location where the support mounts 88 mate with the frame 86. The saddles 100 extend below the frame 86 and restrict motion of the frame 86 on the respective dolly 76 and 78.

The straps 110 are secured at first ends to a respective strap drum 48-54. Second ends of the straps 110 are attached to portions of an overhead support device (not shown and described in more detail below). When a device (not shown) applies a gear driving force to one of the drive assemblies 60, the torque tubes 42 and 44 rotate to allow the strap drums 48-54 to rotate thereby winding-up the straps 110 and lifting the lifting unit 34. Lifting continues until the strap drums 48-51 are positioned within a corresponding pair of the saddles 100 and the torque tubes 42 and 44 are received by the saddles 100, thereby lifting the support frame 86 off of the dollies 76 and 78, as shown in FIG. 3.

In one embodiment of the present invention, the straps 110 extend from the outside of each strap drum 48-54. The drum end of each strap 110 is suitably looped and sewn per loading specifications. The loop (not shown) in the drum end of each strap 110 is secured to the respective strap drum 48-54 via doubling over a steel pin (not shown). The doubled over portion of the strap end rests in a recess (not shown) machined within the drum 48-54. The recess insures that the strap will smoothly lay around the drum diameter. The strap drums 48-54 can receive about 100 in. of 1.75 in. wide strap. Straps of different widths, lengths, and load ratings can be accommodated by adjusting the strap drum dimensions.

Figure 3:
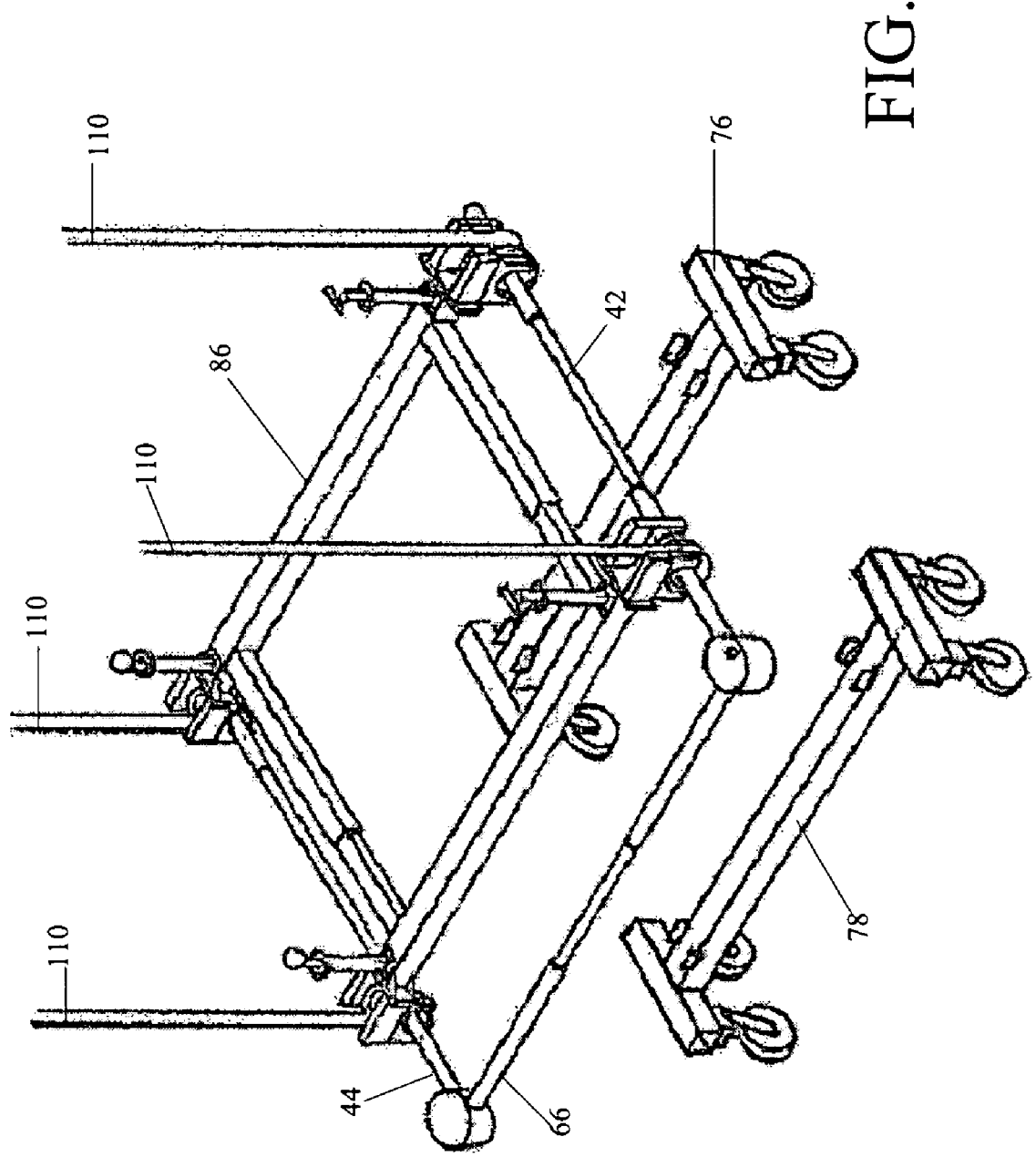
Figure 4A:
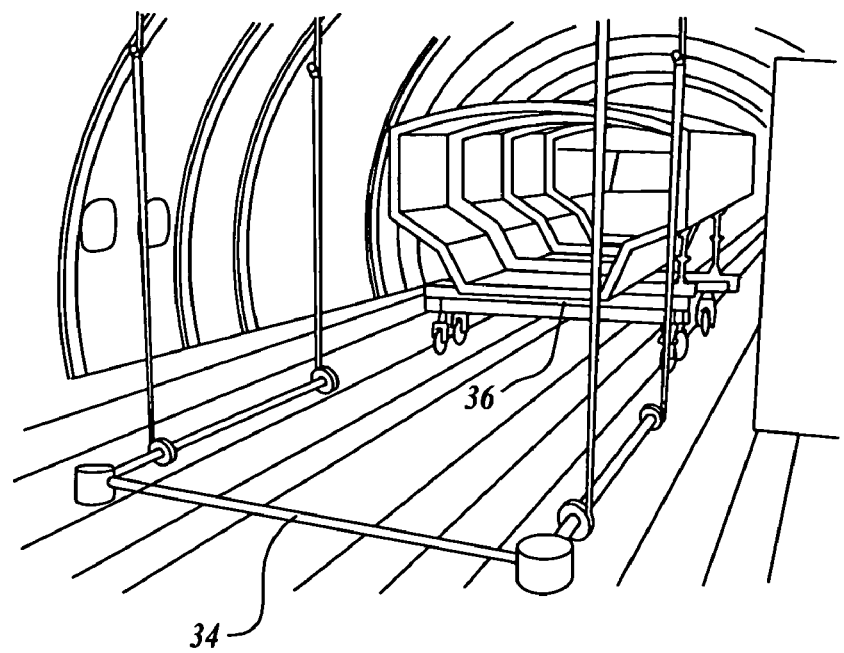
FIGS. 4A-D are perspective views of the module lifting device of FIGS. 2 and 3 in operation.
Figure 4B:
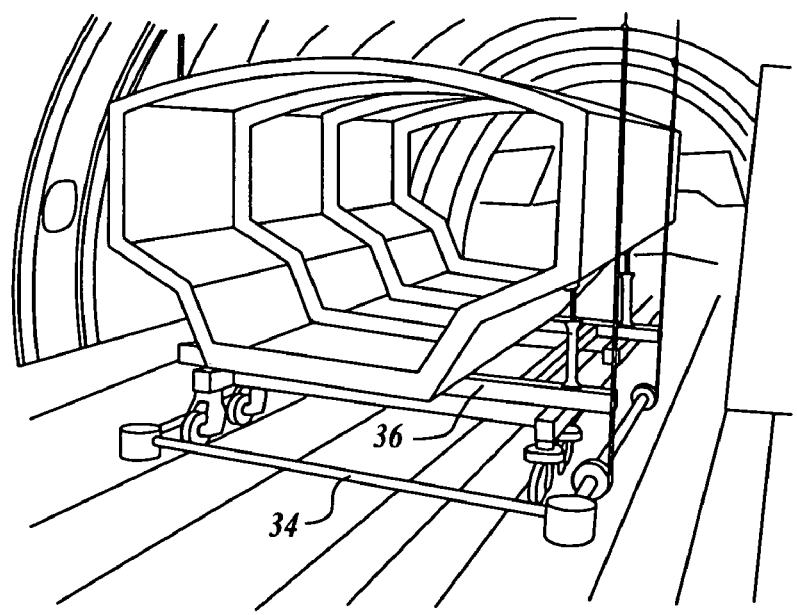
Figure 4C:
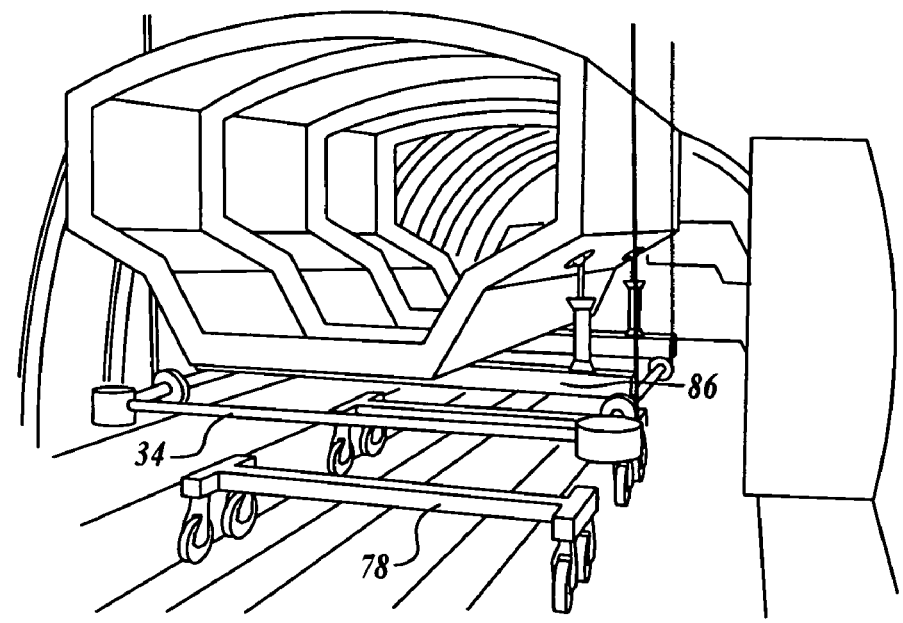
Figure 4D:
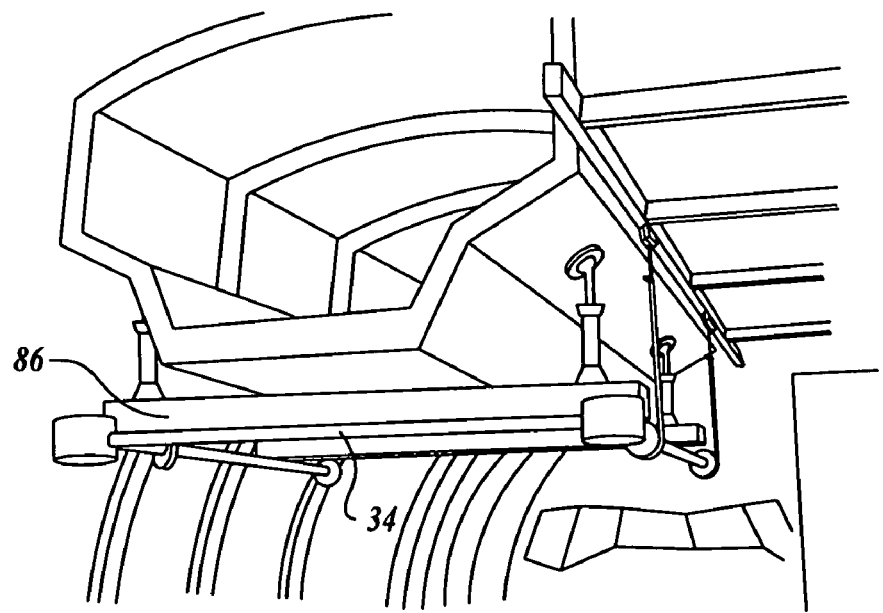

FIGS. 4A-D illustrate an example sequence for lifting a module (a mockup of a module is shown) using the lifting device 30, as shown in FIGS. 2 and 3. Referring to FIG. 4A, the lifting unit 34 is positioned on the deck of the aircraft relative to an overhead support device (not shown). The straps 110 are mounted to the overhead support device (not shown) at the location approximate to where the module is to be placed. The lifting device 30 is formed in a U-shape to receive the support frame 86 that is wheeled into place by the dollies 76 and 78. Referring to FIG. 4B, the support frame 86 is moved within the lifting unit 34 until the straps 110 are received within a corresponding pair of saddles 100. A driving force is then applied to one of the drive assemblies 60, thus, rotating the torque tubes 42 and 44 and raising the lifting unit 34 until the lifting unit 34 is received by all of the saddles 100. The operator then cheeks each strap 110 for length and/or equal tension and makes adjustments via tumbuckles at the upper end of the straps to ensure that the lifting device 30 is level and is fully engaged in all the saddles before continuing with the application of the driving force. This sequence of events lifts the support frame 86 off of the dollies 76 and 78, as shown in FIGS. 4C and 4D.

Figure 5:
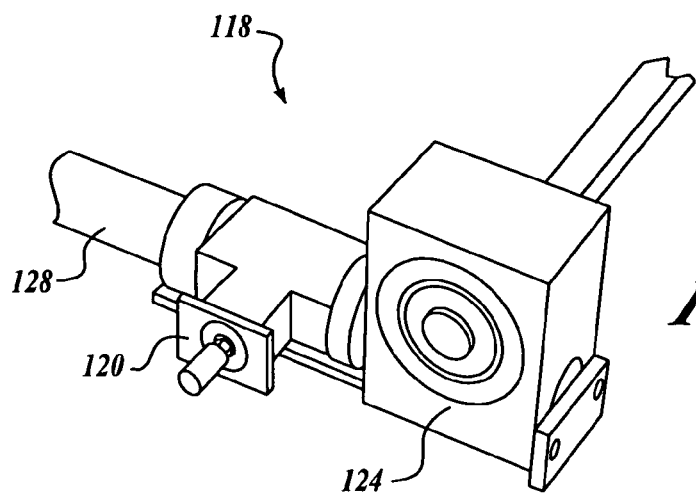
FIGS. 5-7 are perspective views of preferred embodiments of the present invention.
Figure 6:
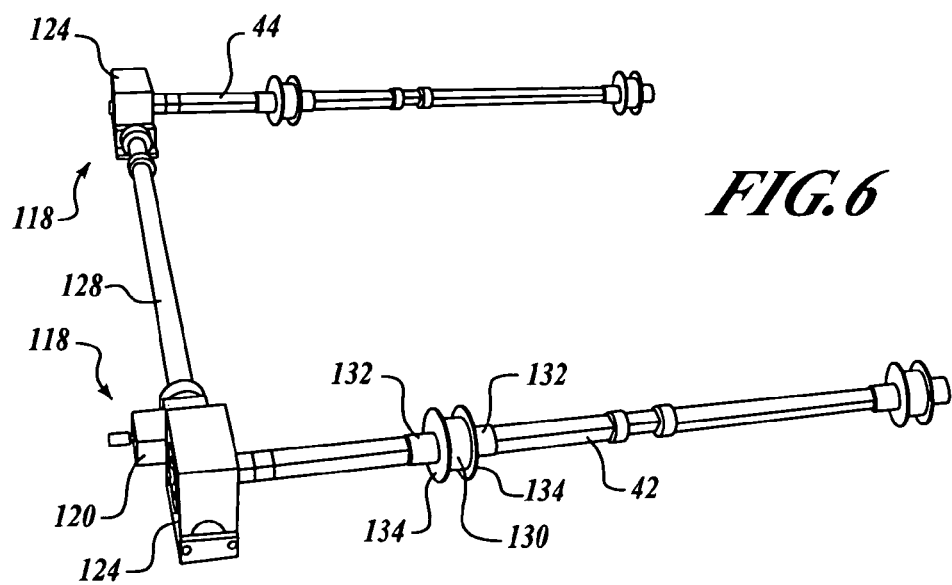

FIGS. 5 and 6 illustrate an exemplary embodiment of a drive assembly 118. The drive assembly 118 includes two worm drive modules 124, a counter-rotating bevel gear box 120, and an extendable torque transfer tube 128. An example of the worm drive module 124 includes a worm drive gear such as that in a Varvel SRT 70-B849 worm drive unit, but other makes and models may be used including heavier duty units if required by the intended loads. One example of the bevel gearbox 120 is a Mitrpak Model C-122-M gearbox with custom hex input shaft, but other makes and models could be used including heavier duty models if required by the intended loads. Keyed shafts (not shown) of both the worm drive module 124 and the bevel gearbox 120 are joined using a hollow coupler (not shown) with keyway. Other shaft coupling devices are possible with off-the-shelf parts. The choice of a coupling device is dependent upon the make and model of selected components as well as the size of the lifting device.

A nutrunner, air ratchet wrench or other similar rotary power tool (not shown) is attached to the bevel gearbox 120 hex input shaft for generating the necessary torque force to activate the lifting device 30. An air motor, electric motor, hydraulic motor, or other torque source may be incorporated into the drive assemblies 118 at the expense of added weight and complexity.

In one embodiment, the bevel gearbox 120 includes bevel gears that suitably provide a 2:1 reduction and the worm drive modules 124 provide a nominal 50:1 reduction for a total reduction ratio of 100:1. If the drive assemblies 118 are configured to handle up to a 600 RPM input, the output RPM at the torque tubes is approximately 4 to 5 RPM depending on the size of the load and the torque source. Other gear ratios are possible depending on the components selected.

Figure 7:
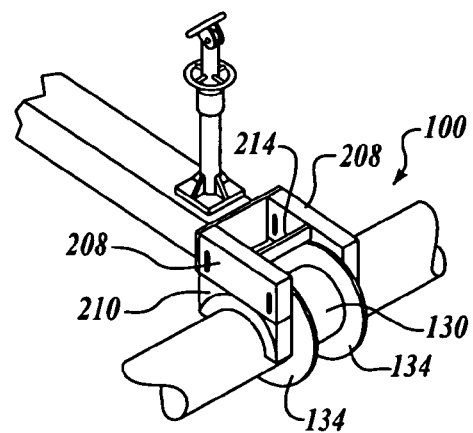
Figure 8:
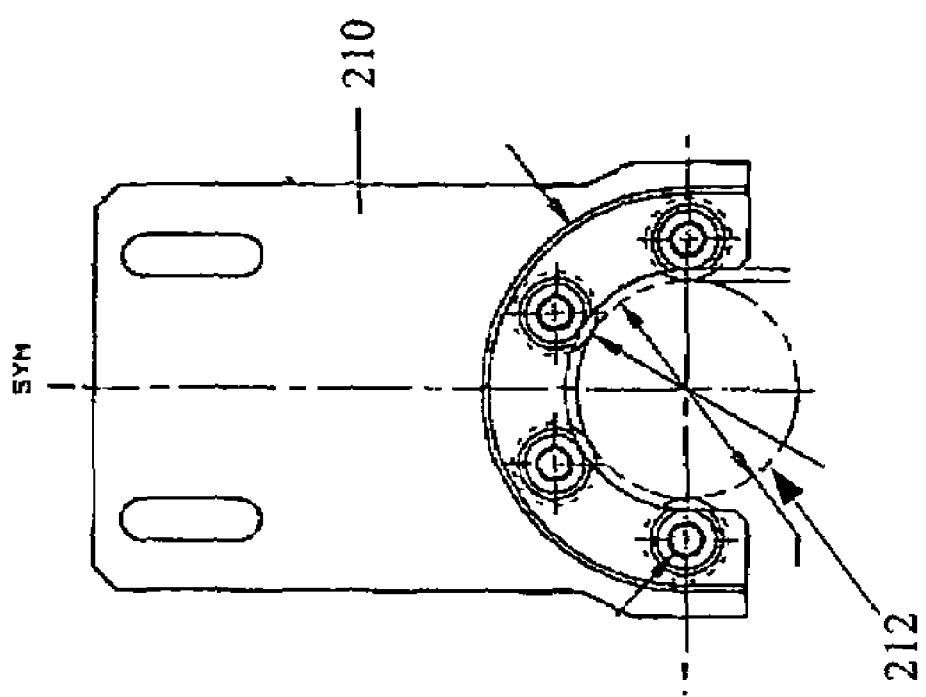
FIG. 8 is a side view of an embodiment of a portion of the present invention.

FIG. 6 illustrates an exemplary embodiment of a lifting unit. The strap drums 48-54 include a spool 130, roller flanges 132 located at the ends of the spool 130, and side flanges 134 located adjacent to the roller flanges 132. The spool 130 includes a square hole that receives a respective torque tube 42 and 44. The roller flanges 132, typically stainless steel (although other materials may be used) slide onto the respective torque tube 42 and 44 and are secured on either side of the spool 130 by the side flanges 134. The roller flanges 132 provide a bearing surface for the saddles 100, as shown in FIGS. 7 and 8. The side flanges 134 are aluminum, although other materials may be used. The side flanges 134 are secured to the spool 130 with shoulder style through bolts. The spools 130 are secured in position on the square torque tubes via dog point setscrews.

Because the strap drums 48-54 are mechanically linked, the most heavily loaded strap drum 48-54 controls the lifting speed, ensuring a level lift if set up was level at the lift start. If power is removed from the bevel gearbox 120, the worm drive module 124 resists overhauling and holds the load in place. The worm drive module 120 safely stops the lifting device 30.

Referring now to FIGS. 7 and 8, a side view of an exemplary saddle 100 is illustrated. The saddle 100 includes two housing sections 208 and two saddle sections 210. The saddle sections 210 are arched at their bases to form a groove 212 for receiving a torque tube 42 and 44. The edge of the saddle sections 210 includes ball bearing members or rotating wheels (i.e. cam followers) that protrude slightly into the groove 212 in order to provide a rolling surface that maintains contact with the respective torque tube 42 and 44. The cam followers roll on the roller flanges 132 while the torque tubes turn. Each of the housing sections 208 includes a spring device (not shown) that receives the saddle section 210. The spring device (not shown) allows the respective saddle section 210 to be flexible with respect to the housing section 208. A crossbeam 214 is coupled between each of the housing sections 208 of the saddle 100. The housing sections 208 are attached to the support frame 86.

Figure 9:
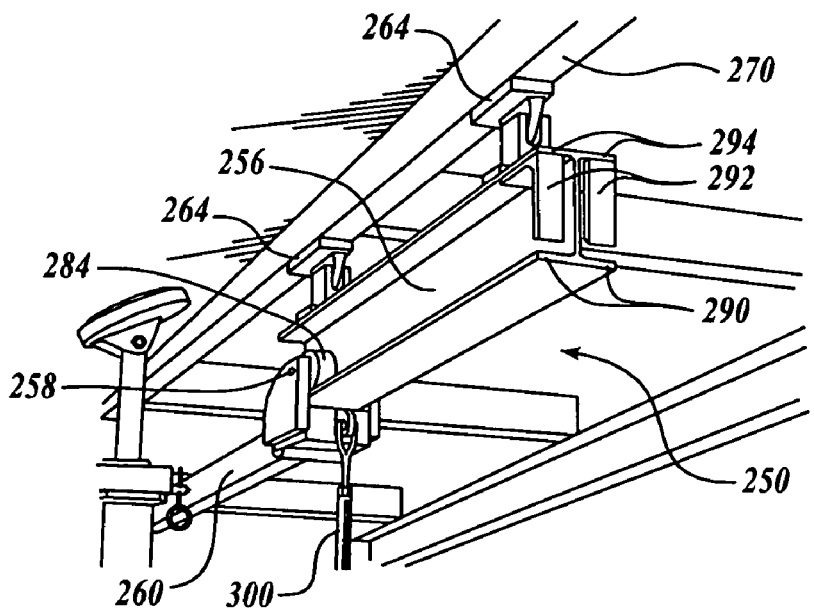
FIGS. 9 and 10 are perspective views of portions of an exemplary adjustment mechanism formed in accordance with the present invention.
Figure 10:
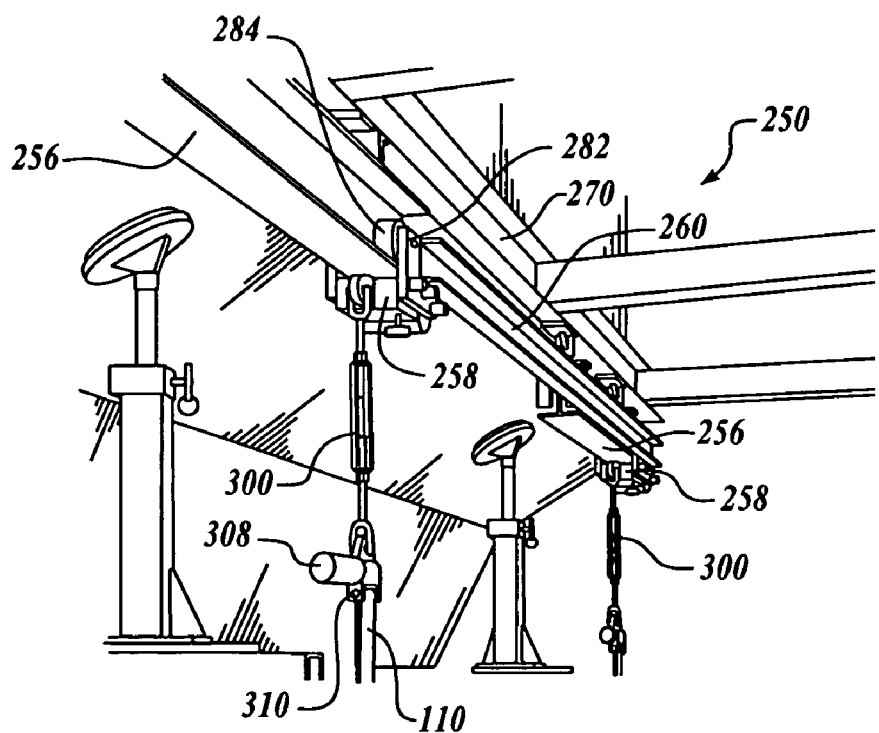

Referring now to FIGS. 9 and 10, one embodiment of an overhead support device 250 is shown. The overhead support device 250 mechanically couples the straps 110 to a frame 270 coupled to the fuselage. The overhead support device 250 includes four rail sections 256, four rail cars 258, and two rail car connectors 260. Each rail section 256 includes connecting devices 264 that attach to a support beam 270 mounted to the fuselage in order to structurally support stowage bins and crown modules. Each rail car 258 in the embodiment shown is U-shaped with two vertical flanges 282 that rotatably receive the wheels 284. The wheels 284 are located on edges of the vertical flanges 282 that face each other. The wheels 284 are spaced apart by a pre-defined distance. The rail sections 256 are I-beams that are received between the wheels 284 of each rail car 258. Each rail car 258 hangs below the wheels 284 and thus below the rail section 256. The wheels 284 ride along a base flange 290 of the rail section 256. An outboard end of the rail section 256 includes stoppers 292 mounted vertically on one of the lower flanges 290 or upper flanges 294 of the rail section 256 at a first end. The stoppers 292 prevent the rail car 258 from sliding off. Each rail section 256 may include a second end opposite the first end that also includes stoppers.

Extending from the rail cars 258 is a turnbuckle 300. Coupled to the turnbuckle 300 is a device 308 that includes a horizontally supported pin 310. The strap 110 is looped around the pin 310 and sewn back onto itself.

Each rail car connectors 260 are attached to two rail cars 258, thereby making sure that when one of the rail cars 258 is moved the other rail car 258 attached to the other end of the rail car connectors 260 is moved. This allows for fine adjustment as to the longitudinal location of the module when lifting it and putting it into place between the support beams 270.

The lifting device 30 allows a module to be lifted level and centered between the support beams 270. Because the lifting device 30 includes lifting straps 110 that are all mechanically linked, the lifting device 30 may be operated by a single installer who applies a rotating tool to the gears (bevel gearbox 120 hex shaft input on the preferred embodiment).

In an alternate embodiment, a single worm gear powers two bevel gear sets that in turn rotate the torque tubes and consequently the strap drums. A passive brake system is desirable for use with the bevel gear sets.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for hoisting a module for attachment to one or more overhead support frames in an aircraft, the apparatus comprising:
   a first frame configured to support the module, the first frame including:
      a first frame support frame configured to support the module, the support frame including at least two telescoping frame members; and
      at least one dolly configured to support a first frame support frame until a first frame support frame is lifted;
   a lifting device configured to lift a first frame support frame, the lifting device including:
      a second frame;
      a plurality of attachment devices configured to attach the second frame to the one or more overhead support frames in the aircraft; and
      a driving device configured to lift the second frame up the plurality of attachment devices, wherein the second frame receives the first frame therein as the second frame is lifted by the driving device to hoist the module for installation in the aircraft.

2. The apparatus of claim 1, wherein the driving device includes:
   a plurality of gear boxes;
   a transfer tube mounted between two of the gear boxes for activating one of the two gear boxes when the other of the two gear boxes is activated; and
   a tube coupled to each of the two gear boxes such that each tube rotates when one of the two gear boxes is activated.

3. The apparatus of claim 2, wherein the plurality of attachment devices include:
   two drums mounted to each of the tubes that are each coupled to one of the two gear boxes; and
   straps attached at a first end to each drum and at a second end to one of the overhead support frames in the aircraft such that each drum receives a respective strap when the tubes are rotated by the respective gear box.

4. The apparatus of claim 3, wherein the tubes that are each coupled to the two gear boxes include telescoping tubes.

5. The apparatus of claim 3, wherein each of the plurality of attachment devices further include:
   two or more rails attachable to the one or more overhead support frames in the aircraft; and
   a plurality of cars having wheels, each car coupled to corresponding straps, wherein the cars are configured to be slideably received by at least one of the rails.

6. The apparatus of claim 5, wherein each of the plurality of cars includes a connector configured to attach at a first end to the car and at a second end to the corresponding strap.

7. The apparatus of claim 6, wherein the connector includes a turnbuckle.

8. The apparatus of claim 2, wherein the plurality of gear boxes includes:
first and second gear boxes; and
a bevel gear mechanically coupled to the first gear box, wherein the transfer tube is mounted to the second gear box and the bevel gear such that the transfer tube activates the second gear box when the bevel gear activates the first gear box.

9. The apparatus of claim 8, wherein the first and second gear boxes include one or more worm gears.

10. The apparatus of claim 8, wherein the first and second gear boxes include one or more bevel gears.

11. The apparatus of claim 2, wherein the plurality of gear boxes includes:
first and second gear boxes; and
a worm gear unit mechanically coupled to one of the first or second gear boxes, wherein the transfer tube is mounted to one of the first or second gear boxes and the worm gear unit, the transfer tube activating one of the first or second gear boxes when the worm gear unit is activated.

12. The apparatus of claim 1, wherein a first frame support frame further includes:
a plurality of mounting pads configured to support the module; and
a plurality of saddles configured to receive the second frame as the second frame is lifted by the driving device.

13. The apparatus of claim 12, wherein the plurality of saddles include devices for rotatably receiving the second frame.

14. An apparatus for hoisting a module for attachment to one or more overhead support frames in an aircraft, the apparatus comprising:
a first frame support frame configured to support the module;
at least one dolly configured to temporarily support a first frame support frame;
a second frame including:
a plurality of gear boxes;
a transfer tube mounted between two of the gear boxes for activating one of the two gear boxes when the other of the two gear boxes is activated;
a tube coupled to each of the two gear boxes such that each tube rotates when one of the two gear boxes is activated; and
two drums mounted to each of the tubes tat are each coupled to one of the two gear boxes;
two or more rails attachable to the one or more overhead support frames in the aircraft;
a plurality of cars having wheels, the cars being configured to be slideably received by at least one of the rails;
a connector configured to attach to a corresponding car; and
straps attached at a first end to each drum and at a second end to the connector, wherein each drum receives a respective strap when the tubes are rotated by the respective gear box, and wherein the second frame lifts a first frame support frame as the second frame is lifted by a driving device to hoist the module for installation in the aircraft.

15. The apparatus of claim 14, wherein the tubes that are each coupled to the two gear boxes include telescoping tubes, and wherein the support frame includes at least two telescoping frame members.

16. The apparatus of claim 14, wherein a first frame support frame further includes:
a plurality of mounting pads configured to support the module; and
a plurality of saddles configured to rotatably receive the tubes that are each coupled to the two gear boxes as the second frame is lifted by the driving device.

17. The apparatus of claim 14, wherein the connector includes a turnbuckle.

18. An apparatus for hoisting a module for attachment to one or more overhead support frames in an aircraft, the apparatus comprising:
a first frame configured to support the module and fit through an aircraft door; and
a lifting device positioned within the aircraft and configured to lift the first frame from a deck within the aircraft, the lifting device including:
a second frame;
a plurality of attachment devices configured to attach the second frame to the one or more overhead support frames in the aircraft; and
a driving device configured to lift the second frame up the plurality of attachment devices, wherein the second frame receives the first frame therein as the second frame is lifted by the driving device to hoist the module for installation in the aircraft.

19. The apparatus of claim 18, wherein the one or more overhead support frames arc mounted in a fuselage crown of the aircraft.

20. The apparatus of claim 19, wherein the module includes a crew rest module.

21. An apparatus for hoisting a module for attachment to one or more overhead support frames in an aircraft, the apparatus comprising:
a first frame configured to support the module; and
a lifting device positioned within the aircraft and configured to lift the first frame from a deck within the aircraft, the lifting device including:
a second frame;
a plurality of attachment devices configured to attach the second frame to the one or more overhead support frames in the aircraft; and
a driving device configured to lift the second frame up the plurality of attachment devices, wherein the second frame receives the first frame therein as the second frame is lifted by the driving device to hoist the module for installation in the aircraft.

22. The apparatus of claim 21, wherein the driving device includes:
a plurality of gear boxes;
a transfer tube mounted between two of the gear boxes for activating one of the two gear boxes when the other of the two gear boxes is activated; and
a tube coupled to each of the two gear boxes such that each tube rotates when one of the two gear boxes is activated.

23. The apparatus of claim 22, wherein the plurality of attachment devices include:
two drums mounted to each of the tubes that are each coupled to one of the two gear boxes; and
straps attached at a first end to each drum and at a second end to one of the overhead support frames in the aircraft such that each drum receives a respective strap when the tubes are rotated by the respective gear box.

24. The apparatus of claim 23, wherein the tubes that are each coupled to the two gear boxes include telescoping tubes.

25. The apparatus of claim 22, wherein the plurality of gear boxes includes:
first and second gear boxes; and
a bevel gear mechanically coupled to the first gear box, wherein the transfer tube is mounted to the second gear box and the bevel gear such that the transfer tube activates the second gear box when the bevel gear activates the first gear box.

26. The apparatus of claim 25, wherein the first and second gear boxes include one or more bevel gears.

27. The apparatus of claim 21, wherein the first frame includes:
a support frame configured to support the module; and
at least one dolly configured to support the support frame until the lifting device lifts the support frame.

28. The apparatus of claim 27, wherein the support frame includes at least two telescoping frame members.

29. The apparatus of claim 27, wherein the support frame further includes:
a plurality of mounting pads configured to support the module; and
a plurality of saddles configured to receive the second frame as the second frame is lifted by the driving device, the plurality of saddles including devices for rotatably receiving the second frame.

* * * * *